United States Patent
Leleannec et al.

(10) Patent No.: US 11,483,559 B2
(45) Date of Patent: Oct. 25, 2022

(54) METHOD AND APPARATUS FOR VIDEO ENCODING AND DECODING WITH PARTIALLY SHARED LUMA AND CHROMA CODING TREES

(71) Applicant: InterDigital VC Holdings, Inc., Wilmington, DE (US)

(72) Inventors: Fabrice Leleannec, Mouaze (FR); Franck Galpin, Thorigne-Fouillard (FR); Tangi Poirier, Thorigne-Fouillard (FR); Gagan Rath, Bhubaneswar (IN)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/056,971

(22) PCT Filed: May 21, 2019

(86) PCT No.: PCT/US2019/033262
§ 371 (c)(1),
(2) Date: Nov. 19, 2020

(87) PCT Pub. No.: WO2019/231751
PCT Pub. Date: Dec. 5, 2019

(65) Prior Publication Data
US 2021/0203929 A1    Jul. 1, 2021

(30) Foreign Application Priority Data
May 29, 2018    (EP) .................................... 18305653

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS 11,134,258 B2 *   9/2021   Karczewicz ......... H04N 19/124
2015/0010048 A1 *  1/2015   Puri ..................... H04N 19/139
                                                      375/240.02
(Continued)

FOREIGN PATENT DOCUMENTS

WO    2016/074567 A1    5/2016
WO    2017/137311 A1    8/2017
WO    WO 2017205700 A1  11/2017

OTHER PUBLICATIONS

Misra et al., "Description of SDR and HDR Video Coding Technology Proposal by Sharp and Foxconn", Joint Video Exploration Team (JVET) of ITU-T SG 16 WP3 and ISO/IEC JTC 1/SC 29/WG 11, Document: JVET-J0026r1, 10th Meeting, San Diego, California, United States, Apr. 10, 2018, 70 pages.
(Continued)

*Primary Examiner* — Talha M Nawaz
(74) *Attorney, Agent, or Firm* — Condo Roccia Koptiw LLP

(57) ABSTRACT

Different implementations are described, particularly implementations for video encoding and decoding based on wherein the partitioning tree structure is partially shared between luma and chroma blocks are presented. According to an implementation, a single partitioning tree structure is shared between luma and chroma blocks from a root node of the partitioning tree down to a switching node and a dual partitioning tree structure is determined for luma and
(Continued)

chroma blocks from the switching node down to a leaf node of the partitioning tree. Thus, this implementation optimizes the coding efficiency by allowing separated trees for smaller blocks, while limiting the complexity of decoding pipeline.

24 Claims, 11 Drawing Sheets

(51) Int. Cl.
    *H04N 19/176*     (2014.01)
    *H04N 19/186*     (2014.01)
    *H04N 19/46*     (2014.01)
    *H04N 19/88*     (2014.01)

(52) U.S. Cl.
    CPC .......... *H04N 19/186* (2014.11); *H04N 19/46* (2014.11); *H04N 19/88* (2014.11)

(56) References Cited

U.S. PATENT DOCUMENTS

| | | | | |
|---|---|---|---|---|
| 2015/0010062 | A1* | 1/2015 | Gokhale | H04N 19/117 |
| | | | | 375/240.03 |
| 2015/0229948 | A1* | 8/2015 | Puri | H04N 19/119 |
| | | | | 375/240.03 |
| 2017/0195675 | A1* | 7/2017 | Seok | H04N 19/15 |
| 2017/0347095 | A1* | 11/2017 | Panusopone | H04N 19/119 |
| 2017/0347123 | A1* | 11/2017 | Panusopone | H04N 19/46 |
| 2019/0075328 | A1* | 3/2019 | Huang | H04N 19/134 |
| 2019/0326931 | A1* | 10/2019 | Liu | H03M 13/1148 |

OTHER PUBLICATIONS

Anonymous, "Conformance specification for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265. 1, Oct. 2014, 42 pages.

Ma et al., "Description of Core Experiment: Partitioning", Joint Video Exploration Team (JVET) of ITU-T SG 16 WP 3 and ISO/IEC JTC 1/SC 29/WG 11, Document JVET-J1021-r5, 10th Meeting, San Diego, California, United States, Apr. 10, 2018, 32 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1: 7th Meeting: Torino, Italy, Jul. 13, 2017, 48 pages.

Chen et al., "Algorithm Description for Versatile Video Coding and Test Model 1 (VTM 1)", Joint Video Experts Team (JVET) of ITU-T SG 16 WP 3 and ISO/IEC JTC 1/SC 29/WG 11, Document JVET-J1002-v1, 10th Meeting: San Diego, California, United States, Apr. 10, 2018, 7 pages.

* cited by examiner

METHOD AND APPARATUS FOR VIDEO ENCODING AND DECODING WITH PARTIALLY SHARED LUMA AND CHROMA CODING TREES

CROSS REFERENCE TO RELATED APPLICATIONS

This application is the national stage entry under 35 U.S.C. § 371 of International Application PCT/US2019/033262, filed May 21, 2019, which was published in accordance with PCT Article 21(2) on Dec. 5, 2019, in English, and which claims the benefit of European Patent Application No. 18305653.0, filed May 29, 2018.

TECHNICAL FIELD

At least one of the present embodiments generally relates to, e.g., a method or an apparatus for video encoding or decoding, and more particularly, to a method or an apparatus wherein the partitioning tree structure is partially shared between luma and chroma blocks.

BACKGROUND

The technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), or compared to under development video compression systems such as VVC (Versatile Video Coding, a new standard being developed by JVET, the Joint Video Experts Team).

To achieve high compression efficiency, image and video coding schemes usually employ partitioning of an image, prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy decoding, inverse quantization, inverse transform, and prediction.

With the emergence of new video coding schemes, the partitioning scheme become more complex and allows dual tree partitioning/coding for luma and chroma to achieve high compression. However, it appears that the dual tree coding scheme raises hardware implementation issue at the decoding stage.

Therefore, there is a need for a new method for coding and decoding a video that jointly ensures high coding efficiency, while taking into account some hardware decoding pipeline constraints.

SUMMARY

The purpose of the invention is to overcome at least one of the disadvantages of the prior art. For this purpose, according to a general aspect of at least one embodiment, a method for video encoding is presented, comprising determining a partitioning tree structure corresponding to a partitioning process of a block of an image of the video, wherein the partitioning tree structure is partially shared between luma and chroma blocks; and encoding the block based at least on the partitioning tree structure.

According to another general aspect of at least one embodiment, a method for video decoding is presented, comprising determining a partitioning tree structure corresponding to a partitioning process of a block of an image of the video, wherein the partitioning tree structure is partially shared between luma and chroma blocks; and decoding the block based at least on said partitioning tree structure.

According to another general aspect of at least one embodiment, an apparatus for video encoding is presented comprising means for implementing any one of the embodiments of the encoding method.

According to another general aspect of at least one embodiment, an apparatus for video decoding is presented comprising means for implementing any one of the embodiments of the decoding method.

According to another general aspect of at least one embodiment, an apparatus for video encoding is provided, comprising one or more processors, and at least one memory. The one or more processors is configured to implement to any one of the embodiments of the encoding method.

According to another general aspect of at least one embodiment, an apparatus for video decoding is provided, comprising one or more processors and at least one memory. The one or more processors is configured to implement to any one of the embodiments of the decoding method.

According to another general aspect of at least one embodiment, a single partitioning tree structure is shared between luma and chroma blocks from a root node of the partitioning tree down to a switching node and a dual partitioning tree structure is determined for luma and chroma blocks from the switching node down to a leaf node of the partitioning tree. Advantageously, this embodiment optimizes the coding efficiency by allowing separated trees for smaller blocks, while limiting the complexity of decoding pipeline.

According to another general aspect of at least one embodiment, the partially shared partitioning tree structure is used for coding or decoding a block belonging to a part of the video image coded in Intra, for instance a tile or a tiles group.

According to another general aspect of at least one embodiment, the partially shared partitioning tree structure is used for coding or decoding a block belonging to a part of the video image coded in Inter, for instance a tile or a tiles group.

According to another general aspect of at least one embodiment, the switching node is implicitly determined. According to a variant of this embodiment, the switching block node is determined based on a partitioning block size. Advantageously, the partitioning block size corresponds to the decoding pipeline unit size and is, for instance, set to 64×64. According to another variant of this embodiment, the switching node is determined based on a partitioning depth level. Advantageously, the partitioning depth level is set to one depth of quad-tree split of the partitioning tree and corresponds to the quad-tree split of a 128×128 CTU into 4 sub-CUs of size 64×64 thus compatible with the decoding pipeline unit size.

A decoding pipeline unit may also be called a Virtual Decoding Pipeline Unit (VPDU).

According to another general aspect of at least one embodiment, the switching node is signaled. Advantageously, this embodiment allows to adapt the switching node for each CTU, for instance based on RD cost.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions. According to another general aspect of at least one embodiment, the signal data is interleaved based on a partitioning block size. The signal data is thus advantageously arranged for the decoding pipeline unit.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of an image. They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to method for encoding or decoding a video wherein the tree coding/partitioning structure is partially shared between luma and chroma blocks.

Figure 1:
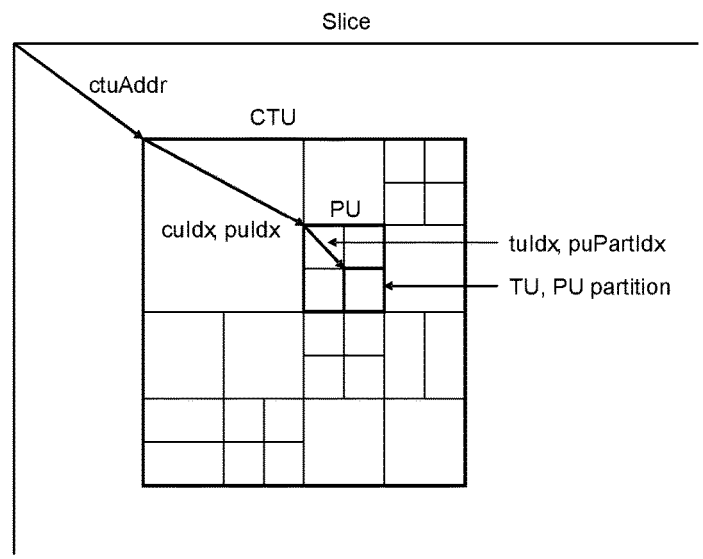
FIG. 1 illustrates an example of Coding Tree Unit (CTU) and Coding Tree (CT) concepts to represent a compressed HEVC picture.

In the HEVC video compression standard, an image is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU). Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as shown on FIG. 1.

Figure 2:
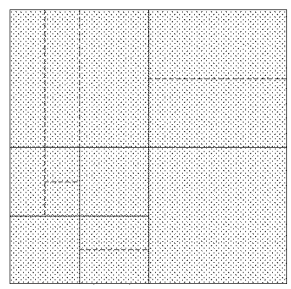
FIG. 2 illustrates an example of partitioning of a Coding Unit and associated Coding Tree in the Quad-Tree plus Binary-Tree (QTBT) scheme.
Figure 2:
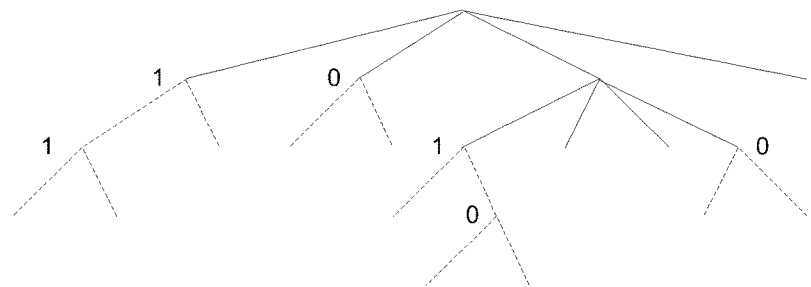

New emerging video compression tools include a more flexible Coding Tree Unit representation in the compressed domain that provides increased compression efficiency compared to the CU/PU/TU arrangement of the HEVC standard. Firstly, the Coding Tree Unit representation includes a Quad-Tree plus Binary-Tree (QTBT) which is a coding structure where coding units can be split both in a quad-tree and in a binary-tree fashion. An example of coding tree representation of a Coding Tree Unit is illustrated on FIG. 2. The splitting of a coding unit is decided on the encoder side through a rate distortion optimization procedure, which consists in determining the QTBT representation of the CTU with minimal rate distortion cost. In the QTBT technology, a CU has either square or rectangular shape. The size of coding unit is always a power of 2, and typically goes from 4 to 128.

In addition to this variety of rectangular shapes for a coding unit, this new CTU representation has the following different characteristics compared to HEVC. First, the QTBT decomposition of a CTU is made of two stages: first the CTU is split in a quad-tree fashion, then each quad-tree leaf can be further divided in a binary fashion. This is illustrated on the right of FIG. 2 where solid lines represent the quad-tree decomposition phase and dashed lines represent the binary decomposition that is spatially embedded in the quad-tree leaves.

Secondly, in Intra slices, the Luma and Chroma block partitioning structure is separated, and decided independently.

Thirdly, no more CU partitioning into predictions units or transform unit is employed. In other words, each Coding Unit is systematically made of a single prediction unit (2N×2N prediction unit partition type) and single transform unit (no division into a transform tree).

Figure 3:
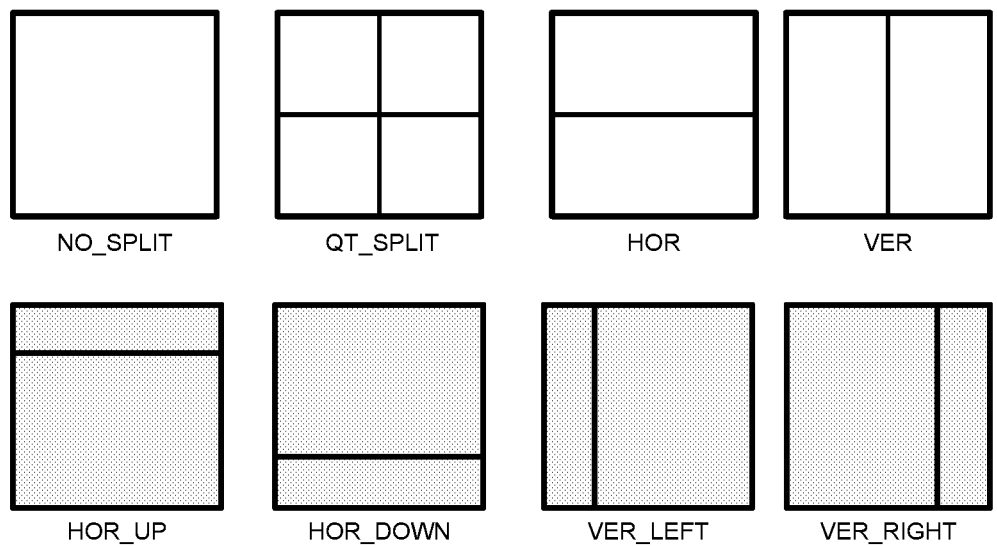
FIGS. 3 and 4 illustrate examples of some CU binary or triple tree partitioning.
Figure 4:
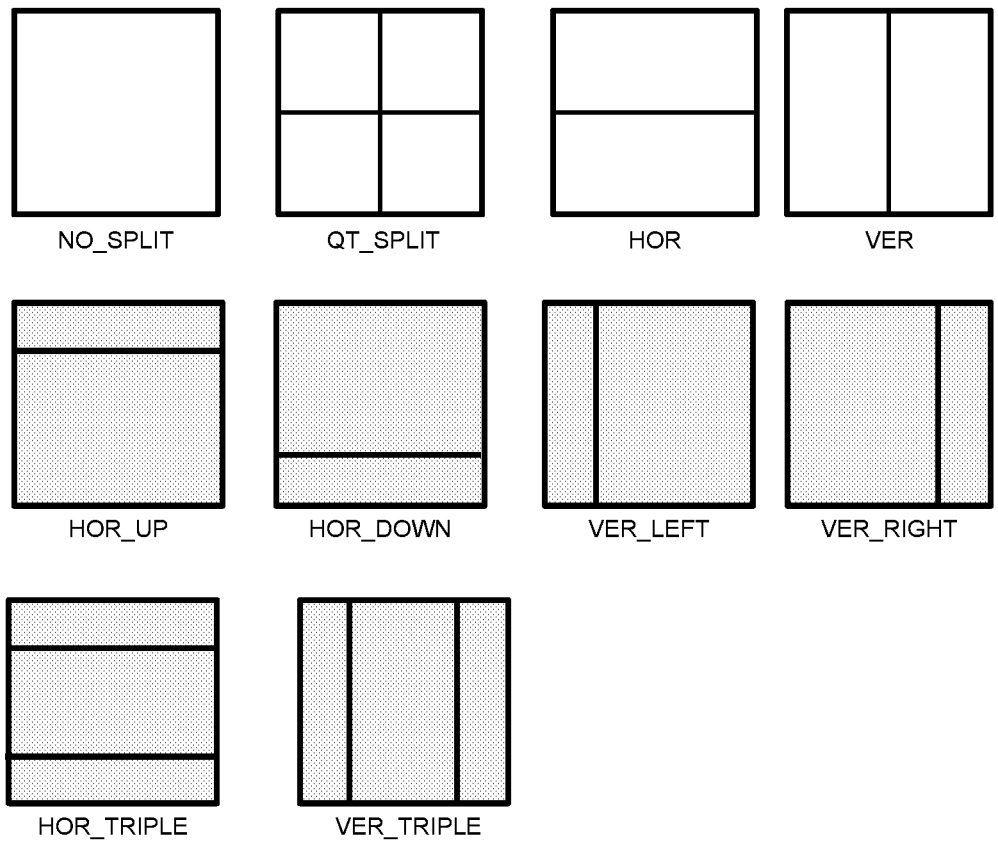

Finally, some other CU binary or triple tree partitioning may also be employed in the representation of the CTU's coding tree, as illustrated on FIG. 3 or FIG. 4. FIG. 3 illustrates CU partitioning in an asymmetric binary tree wherein a square or rectangular coding unit with size (w, h)

(width and height) is split through one of the asymmetric binary splitting modes, for example HOR_UP (horizontal-up), leading to 2 sub-coding units with respective rectangular sizes $$\left(w, \frac{h}{4}\right) \text{ and } \left(w, \frac{3h}{4}\right).$$

In addition, the so-called triple tree partitioning of a CU is represented on FIG. 4. Triple tree consists in splitting a CU into tree sub-CU with size (¼,½,¼) relative to the parent CU, in the considered orientation.

A significant coding efficiency improvement is brought using the new topologies described above. In particular, a significantly gain is obtained in chroma. This large gain in the chroma component heavily results from the separation of the Luma and Chroma coding trees in Intra slices. However, this separation of the Luma and Chroma coding tree on the CTU level has some issues in terms of hardware implementation. In at least one embodiment, the CTU is typically of size 128×128 or 256×256. Moreover, fully separating the coding trees of the Luma and Chroma components implies that these Luma and Chroma are also fully separated in the compressed domain, hence also appear in a separated way in the coded bit-stream. This causes some issue for at least one decoder implementation, where one would like to ensure that a decoding pipeline is achieved on a maximum decoding unit size which may be smaller than the CTU size.

Typically, a 64×64 based decoder pipeline is desired for at least one decoder implementation. To do so, a maximum transform block size equal to 64×64 has been chosen. In addition, the separation of the Luma and Chroma coding tree is removed, because it would imply a coded bit-stream where all the Luma blocks of a CTU appear before the Chroma blocks in the same CTU. In such case, the decoding process would lead to the parsing, hence the generation of a decoded quantized block data that would spatially cover the whole CTU, i.e. a 128×128 or 256×256 picture area. The consequence of removing the Luma/Chroma coding separation is a loss in coding efficiency, compared to the case where these trees are chosen, coded and decoded independently.

It is thus desirable to have Luma and Chroma coding tree representations in a way that optimizes coding efficiency, while ensuring that a decoding pipeline, for instance a decoding pipeline on a 64×64 block basis, is feasible.

To that end, at least one embodiment comprises:
  Having a joint Luma/Chroma coding tree from the maximum allowed block size (CTU size) down to a pre-defined block size or up to a pre-defined CU depth level, which are determined according to a pipeline decoding unit. Then, when the block sizes is lower or equal to the pipeline decoding unit, selecting, encoding and decoding the luma and chroma coding tree in a separated manner. This means a part of the overall CTU coding tree is shared by luma and chroma components, and then, beyond a certain depth level in the CTU coding tree, the luma and chroma trees are independent, thus can be different. In the following of this description, to mention this aspect, the term partially shared Luma/Chroma coding trees is used.
  Switching from an interleaved luma/chroma coding process to a separated luma/chroma coding process, according to the block size associated to the processed coding tree node, or according to the depth level of the coding tree node being encoded/decoded.

In practice, assuming a decoding pipeline unit of 64×64, when coding the luma and chroma coding trees, the coding trees are jointly decided and coded down to a block size greater than 64×64. Then the luma/chroma coding trees possibly diverge from each other, for block sizes lower than 64×64.

Advantageously, this process also ensures that in the bit-stream organization, the luma and chroma compressed signals appear one after the other one, for each picture area equal to the considered decoding pipeline unit (64×64). Thus, when parsing the bit-stream, it is ensured that the block residual signal associated to a picture area equal to the pipeline decoding unit 64×64 is fully decoded for both luma and chroma components, before starting to process a next pipeline decoding unit.

Besides, the coding efficiency is improved compared to the full separation of the Luma/Chroma coding tree.

In section 1, several embodiments of a partially shared luma/chroma coding trees and associated bit-stream organization are disclosed.

In section 2, several embodiments of an encoding method are disclosed.

In sections 3 and 4, several embodiments of a decoding method are disclosed.

In section 5, additional information and generic embodiments are disclosed.

Figure 5:
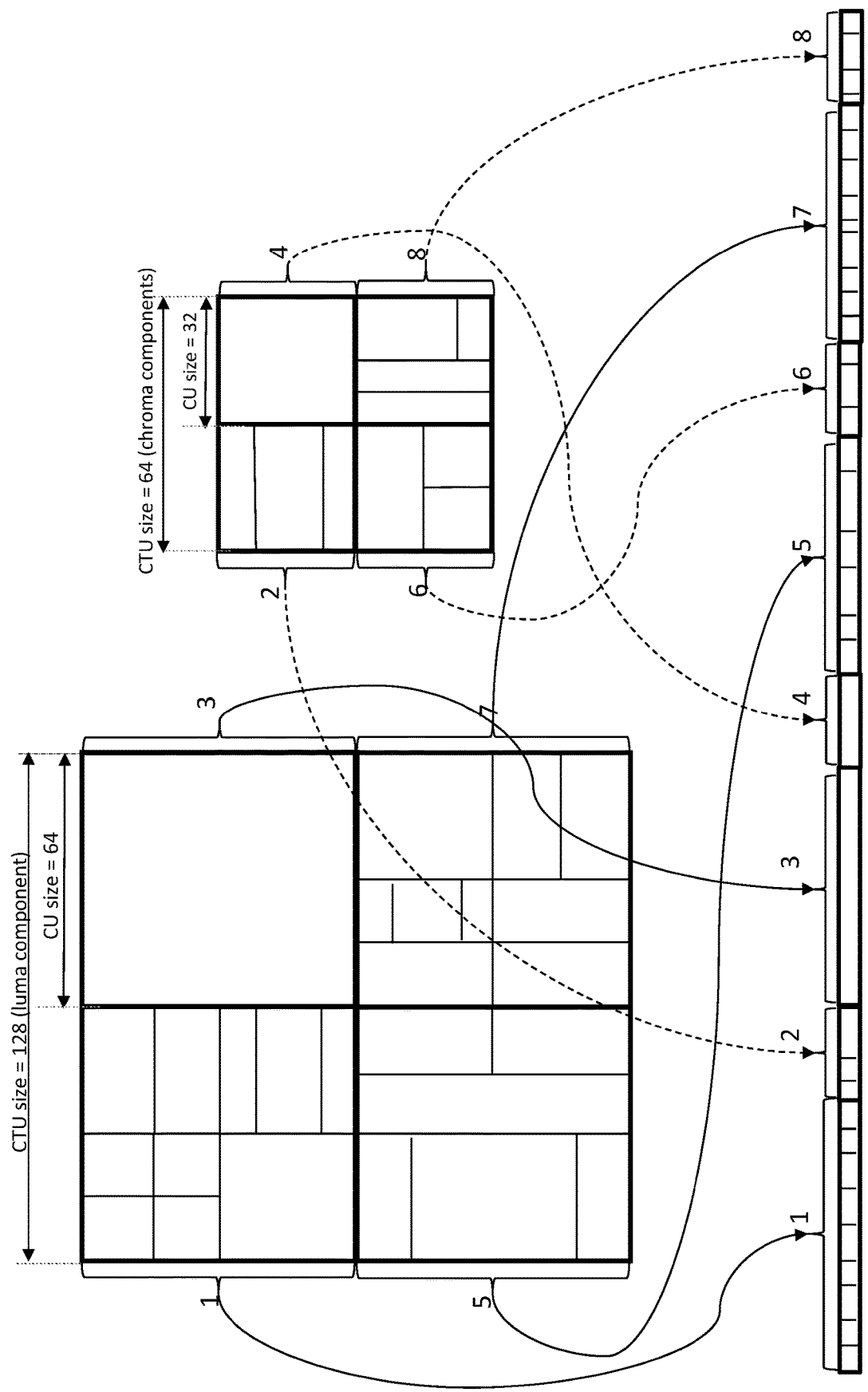
FIGS. 5 and 6 illustrate examples of partitioning of a non-limiting embodiment of CTU, respectively in Luma and Chroma components according to a general aspect of at least one embodiment.
Figure 6:
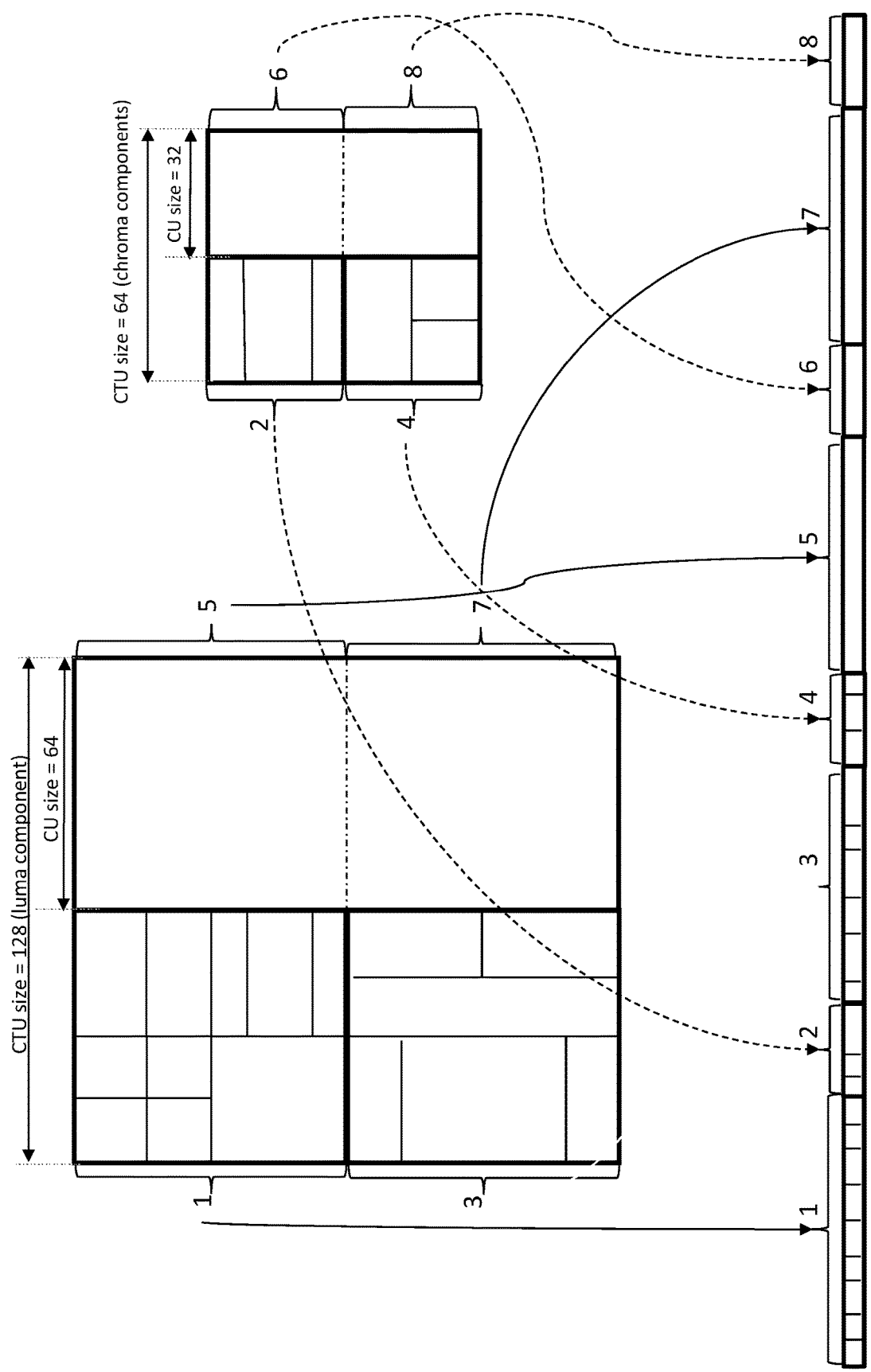

1 An Embodiment of a Partially Shared Luma/Chroma Coding Trees, and Associated Bit-Stream Organization FIGS. 5 and 6 illustrate examples of partitioning of a non-limiting embodiment of CTU, respectively in Luma and Chroma components according to a general aspect of at least one embodiment. On both examples, the considered CTU size is 128×128 and the considered decoding pipeline unit is 64×64.

FIG. 5 illustrates a first example where the CTU is first split in a quad-tree fashion. This leads to 64×64 coding units in the Luma component as shown on the left of the figure, which are aligned with the corresponding 32×32 CUs in the chroma components as shown on the right of the figure. As can be seen, the two luma and chroma split type are identical, when the size of the CU to split is higher than the decoding unit size 64×64. Next, for Luma CU smaller or equal to 64×64, the split modes may differ between Luma and Chroma. This is the case on FIG. 5, except for the top-right 64×64 CU (3 and 4).

The bottom of FIG. 5 shows the bit-stream organization proposed here, in the case of the Luma and Chroma coding trees of FIG. 5. As can be seen, according to an embodiment of the bit-stream arrangement, the bit-stream is made of contiguous parts respectively comprising series of coded Luma blocks and series of coded Chroma blocks. The bit-stream is organized in such a way that a series of coded Luma or Chroma block corresponds to a spatial area that is not higher than 64×64 (in the Luma domain), i.e. the imposed Luma size for the decoding pipeline unit.

In a particular embodiment, a bit-stream portion comprising a given series of coded Luma or Chroma block exactly contains the coded data of a spatial area of the considered picture, which size is equal to the considered decoding pipeline unit size. Typically, this size is 64×64.

FIG. 6 illustrates another embodiment of a partially shared luma/chroma coding trees. The 128×128 first undergoes a vertical binary split, which leads to two 64×128 Coding units. Since for CU sizes larger than 64×64, luma and chroma are synchronized, the CTU is split the same way in chroma components, leading to two 64×32 CUs. The right CUs is not split anymore. The left 128×64 is divided though the binary horizontal split mode, in a synchronous way in Luma and Chroma component (shared/synchronous part of the coding tree arrangement according to at least one embodiment).

Furthermore, with respect to CU resulting from this second binary split stage, hence have size 64×64 in Luma, they can be further split, in a separated way between Luma and Chroma components. Finally, the resulting bit-stream arrangement and ordering is shown on the bottom of FIG. 6. A particular aspect to note here is that since the maximum decoding unit size is 64×64, the maximum transform size is also 64×64. Thus, in the case of the 64×128 CU on FIG. 6, the CU is split into 2 transform units 64×64 in the luma component. Synchronously, it is split in two 32×32 CUs in the 2 chroma components. Then, in terms of bit-stream ordering, the 64×64 Luma and 32×32 Chroma transform blocks resulting from this spatial division are interleaved in the bit-stream, to ensure that all Luma and Chroma coded data corresponding to a spatial area of size 64×64 are packed together in the coded bi-stream. This corresponds to the coded data block 5, 6, 7 and 8 of FIG. 6.

2 at Least One Embodiment of the Encoding

Figure 7:
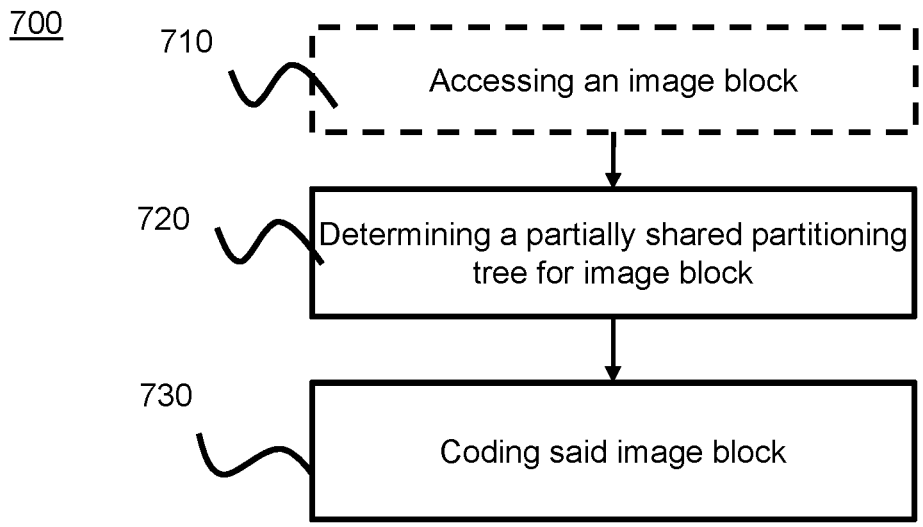
FIGS. 7 and 8 illustrate various examples of an encoding method according to a general aspect of at least one embodiment.

FIG. 7 illustrates an example of an encoding method 700 according to a general aspect of at least one embodiment.

In a preliminary step 710, a block is accessed for encoding. The block, typically a CU, belongs to a spatial partition of an image of a video, typically a CTU in the previous sections. The encoding method 700 recursively determines, for the block to be encoded, a partitioning or splitting into sub-blocks. Typically, the method starts with a block being a CTU in the previous sections. For instance, the block is split into sub-block according to any of the split modes described with FIG. 2, 3 or 4. A partitioning tree structure, also referred to as a coding tree or partition information, indicates how the image is partitioned. Accordingly, in a step 720, a partitioning tree structure corresponding to a partitioning process of the block is determined.

Advantageously, the partitioning tree structure is partially shared between luma and chroma blocks. A partitioning tree structure partially shared between luma and chroma blocks means that for some blocks in the partitioning tree, a single partitioning tree structure is used for both luma and chroma blocks while for others blocks in the partitioning tree, a separated partitioning tree structure is used for luma blocks and for chroma blocks. For instance, the luma block, corresponding to the luma component of the CTU on FIG. 5, shares the first quadtree split in the partitioning tree structure with the chroma block corresponding to any of the chroma components of CTU. Then, the luma block 1, corresponding to the luma component of the CU 1 on FIG. 5, and the chroma block 2 corresponding to any of the chroma components of CU 2, are split in a different way therefore a dual partitioning tree structure is determined for luma block 1 and for the co-located chroma blocks 2. In the following the terms separated tree and dual tree are indifferently used for defining 2 trees while the terms common tree, shared tree, joint tree and single tree are indifferently used for defining a common tree for both luma and chroma components. In a step 730, the block is coded based at least on the determined partitioning tree structure.

According to an embodiment, a single partitioning tree structure is shared between luma and chroma blocks from a root node of the partitioning tree down to a switching node and a dual partitioning tree structure is determined for luma and chroma blocks from the switching node down to a leaf node of the partitioning tree. Thus, the shared coding tree is used for larger blocks while separated trees are used for smaller blocks, the switching between the shared coding tree and the dual coding tree being defined by a switching point or level. For instance, the root node corresponds to a CTU while the leaf node corresponds to a leaf CU. Advantageously, this embodiment optimizes the coding efficiency by allowing separated trees for some blocks, while limiting the complexity of decoding pipeline.

According to an embodiment, the partially shared partitioning tree structure is used for coding a block belonging to a part of the video image coded in Intra. For instance, the part of the video image is a tile or a tiles group and the partially shared luma and chroma coding trees are used in Intra tiles or Intra tiles group only.

According to another embodiment the partially shared partitioning tree structure is used for coding a block belonging to a part of the video image coded in Inter.

According to an embodiment, the switching node is implicitly determined. Advantageously, this embodiment allows not signaling the switching node from the encoder to the decoder. In a first variant, the switching block node is determined based on a partitioning block size. The partitioning block size is thus a parameter pre-defined in the encoder and in the decoder. For instance, the switching from a shared luma/chroma coding tree towards 2 separated luma and chroma sub-tree is decided based on the size of the coding unit, relative to a considered decoding unit size. According to a preferred variant, the partitioning block size is set to 64×64 thus allowing a decoding pipeline on a 64×64 block basis. As illustrated on FIG. 5, the CTU 128×128 shares its coding tree for both chroma and luma components while for CU of size lower or equal to 64×64, the sub-trees are separated for chroma and luma components.

In a second variant, the switching block node is determined based on a partitioning depth level. The partitioning block size is thus a parameter pre-defined in the encoder and in the decoder. According to a preferred example, the partitioning depth level is set to one depth of quad-tree split of the partitioning tree. As illustrated on FIG. 5, the shared tree of the CTU comprises the first quad tree-split and below the sub-trees are separated for the CUs. For instance, the switching from a shared luma/chroma coding tree towards 2 separated luma and chroma sub-trees is decided based on the depth level of coding unit, relative to CU depth threshold. In a particular variant, the first quad tree split is inferred. This variant is well adapted to a CTU size of 128×128 where a first QT-split results in 4 CUs of size 64×64 where dual trees are then processed for luma and chroma components. In other words, the switching from a shared luma/chroma coding tree towards 2 separated luma and chroma sub-tree is decided based on the quad-tree depth level only, relative to CU quad-tree depth threshold. Indeed, in the QTBT coding structure, a CTU first undergoes a quad-tree splitting process, before entering a so-called binary/ternary tree splitting process. Thus, two types of CU depth levels can be considered: the quad-tree related depth level and the binary/ternary tree depth level. A CU that undergoes quad-tree split has a binary/ternary tree level equal to 0, and the quad-tree splitting leads to 4 sub-CU with a quad-tree related depth level increased by 1 compared to the parent CU.

In a third variant, the switching block node is also determined based on a partitioning depth level wherein a compound quad-tree/binary-tree/ternary-tree depth level is associated to each CU. This compound depth is exemplarily computed as follows. In case a CU is quad-tree split, the compound depth is increased by 3 between the parent and the children CUs. In case a CU is binary-tree split, the compound depth is increased by 2 between the parent and the children CUs. In case a CU is ternary-tree split, the compound depth is increased by 1 between the parent and the middle children CU and is increased by 3 between the parent and the two others (non-middle) children CUs. In the scope of this embodiment, the switching between the dual luma/chroma coding tree to the separated trees is decided according compound depth level of current CU relative to a compound depth threshold.

According to an embodiment, the switching node is signaled. Advantageously, this embodiment allows to adapt the switching node for each CTU, for instance based on RD cost.

Figure 8:
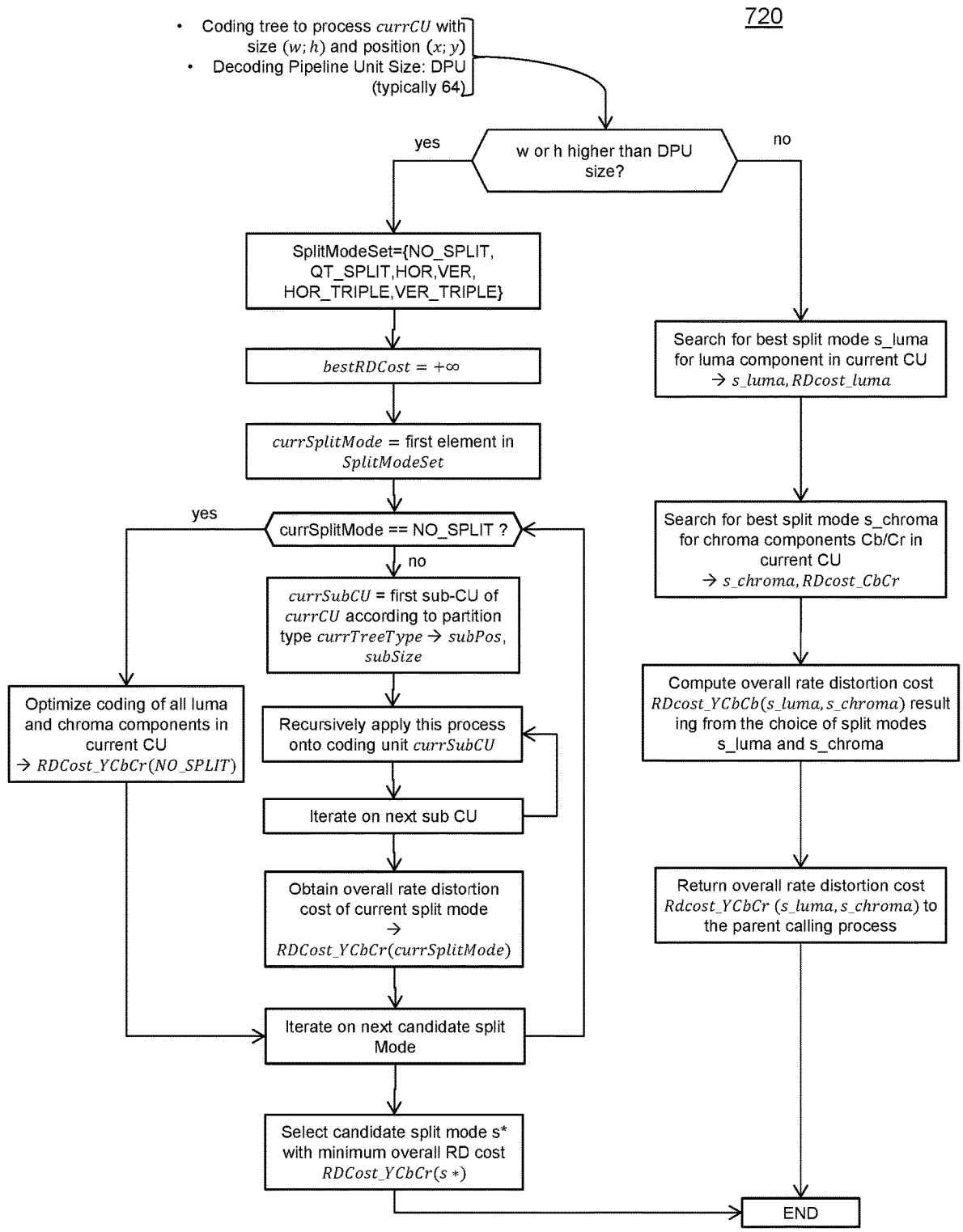

FIG. 8 illustrates another example of an encoding method according to at least one embodiment. FIG. 8 shows an embodiment of the determining step 720 of the partially shared Luma and Chroma coding trees of a given CTU at the encoder. The embodiment of FIG. 8 corresponds to the embodiment where the switching node is determined based on the partitioning block size. This decision process involves a recursive rate distortion optimization procedure, to search for the two Luma and Chroma coding trees that jointly minimize an overall Rate Distortion cost on the CTU level. To do so, at each depth level of the recursive process, a set of (or a part of) candidate split modes for the considered Coding Unit (which corresponds to the whole CTU at the beginning of the process) is envisioned. Two main cases are shown on FIG. 8, respectively on the left (branch yes) and on the right side (branch no) of the diagram.

Left side corresponds to the case where current CU has size strictly larger than the decoding pipeline unit size. In that case, according to at least one embodiment, a single split mode, commonly used in the Luma and Chroma components, has to be chosen. To do so, each split mode s or CurrentSplitMode in a set of allowed candidates split modes for current CU is evaluated, which leads to an associated rate distortion cost RDcost_YCbCr(CurrentSplitMode) associated the best coding of the considered CU that can be performed when choosing split mode s at the current depth level. The evaluation of split mode s thus involved the partitioning of current CU according to split mode s, and then a loop over each resulting sub-coding unit (sub-CU). For each sub-CU, the current RDO process is invoked in a recursive way, so as to determine the split mode for the considered sub-CU. This loop over candidate split mode then results in the determination of the split mode that minimize the joint Luma/Chroma Rate Distortion cost associated to current CU.

In case of a 128×128 CTUs, a quad tree split operation divides 128×128 CTUs into 4 64×64 Coding Units. This split is either signaled as part of the common Chroma/Luma coding tree or inferred thus saving bits. Note in the case where the quad-tree split mode is inferred for CUs larger than the decoding pipeline unit size 64×64, then left side of the process of FIG. 8 simply consists in splitting the input CU into 4 sub-CU, and recursively apply the process of FIG. 8, successively onto each resulting sub-CU.

With respect to the right side of the algorithm of FIG. 8, it corresponds to the case where the overall RD search process has reached a depth level in the coding tree, which corresponds to a coding unit size lower or equal to the size of the considered decoding pipeline unit, i.e. the switching node. In that case, at least one embodiment proposes to switch from a joint luma/chroma coding tree to separated luma and chroma sub-coding tree, from the considered depth level in the overall coding tree representation being optimized. Thus, the determination of the Luma and the Chroma coding trees associated to the current CU takes the form of two separate, successive optimizations procedures, which respectively find the best Luma coding tree and the best chroma coding tree for current CU.

This corresponds to the two RDO steps that follow on FIG. 8. The optimization steps are known from the man skilled in the art. Next step comprises computing the overall joint Luma/Chroma rate distortion cost RDcost_YCbCr (s_luma,s_chroma) that results from the obtained separated luma and chroma sub-coding tree. s_luma and s_chroma respectively stand for the best split mode found for current CU, in Luma (Y) and Chroma (Cb+Cr) components. This joint RD cost can be simply computed by summing the rates of the luma and chroma components (giving overall rate R), and by computing the overall distortion D as the sum of the luma and chroma distortions resulting from the two separated coding tree searches. The overall RD cost is then obtained according to the classical formula, where $\lambda$ is the known Lagrange parameter:

$$RDcost = D + \lambda \cdot R$$

Note in the case where the quad-tree split mode is inferred for CUs larger than the decoding pipeline unit size 64×64, the rate distortion optimal split modes s_luma and s_chroma are assigned to the current CU currCU, respectively in Luma and Chroma channels. Indeed, no rate distortion competition between split modes takes place for CUs larger than the decoding pipeline unit size.

First module/operation (possible sharing or not of luma/chroma coding tree) from FIG. 8 can be located, for example, in module 102 (image partitioning) of FIG. 13 (shown later).

3 an Embodiment of the Decoding

Figure 9:
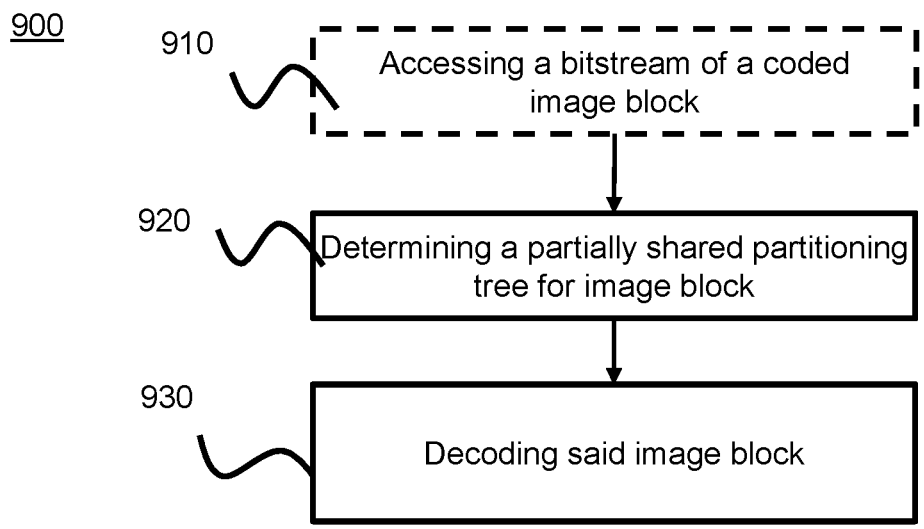
FIGS. 9, 10, 11 and 12 illustrate various examples of a decoding method according to a general aspect of at least one embodiment.

FIG. 9 illustrates an example of a decoding method 900 according to a general aspect of at least one embodiment.

In a preliminary step 910, a bitstream or signal of a coded block is accessed for decoding. The coded block is typically a CU or a CTU. The decoding method 900 recursively determines, for the block to be decoded, a partitioning or splitting into sub-blocks. For instance, the coded block is split into sub-blocks according to any of the split modes described with FIG. 2, 3 or 4. Accordingly, in a step 920, a partitioning tree structure corresponding to a partitioning process of the block is determined. Advantageously, the partitioning tree structure is partially shared between luma and chroma blocks. For instance, the partitioning tree structure is obtained from the decoding process and from the syntax elements associated with the coded block. This is later described with the variant embodiments of FIGS. 10-13. In a step 930, the block is decoded based at least on the determined partitioning tree structure.

The man skilled in the art will easily adapt the variant embodiments described for the encoding method to the decoding method 900 which are therefore not repeated here.

Figure 10:
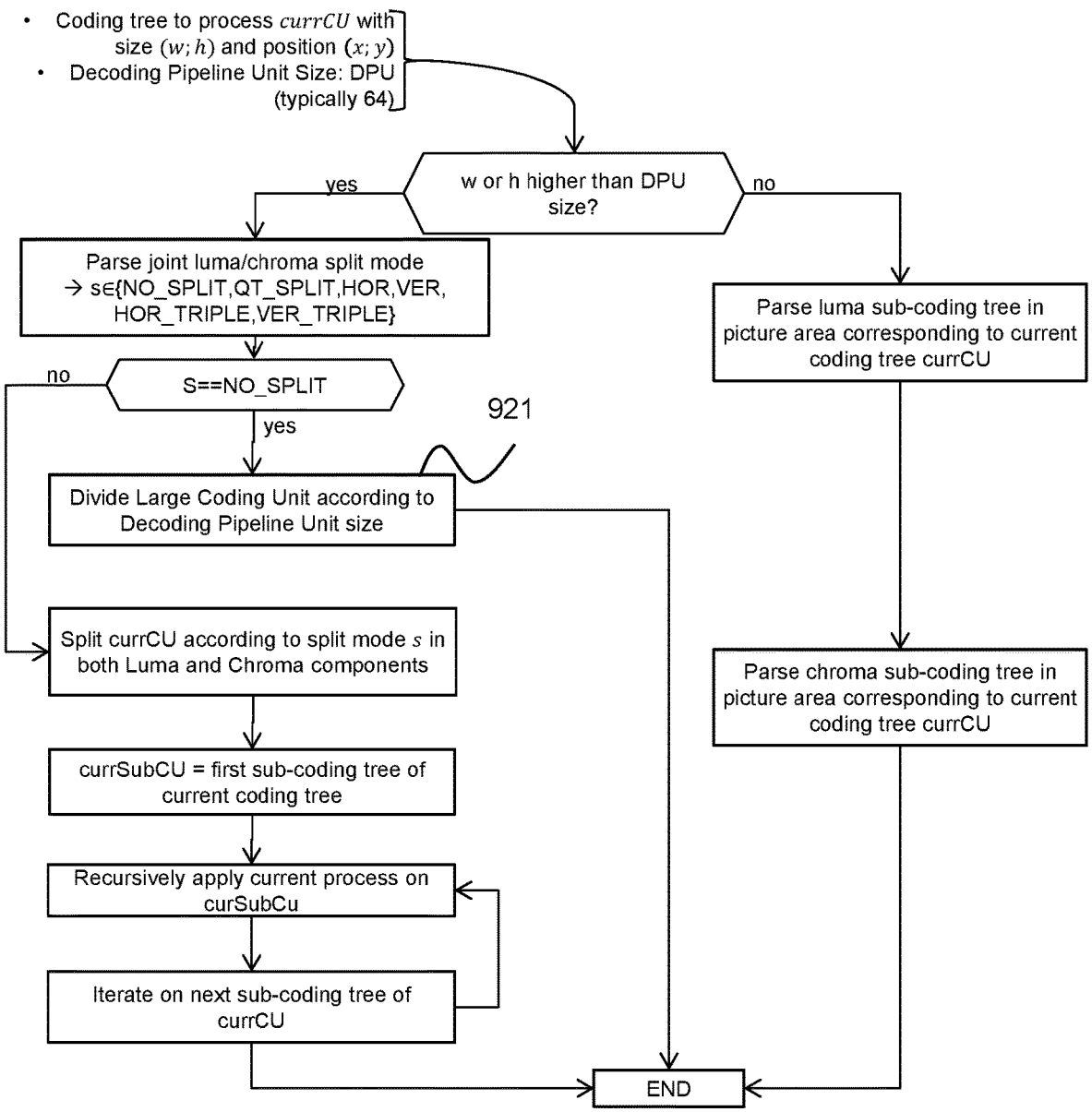

FIG. 10 illustrates another example of a decoding method according to a general aspect of at least one embodiment. FIG. 10 shows an embodiment of the determining step 920 of the partially shared Luma and Chroma coding trees of a given CTU at the decoder. The embodiment of FIG. 10 corresponds to the embodiment where the switching node is determined based on the partitioning block size. As for the encoding, this process is also made of two parts, respectively shown on left side and on right side of the diagram of FIG. 10. Left side of FIG. 10 illustrates the processing of a CU with size larger that the considered decoding pipeline unit in width or height. Right side of FIG. 10 illustrates the decoding of coding units smaller or equal to the size of the considered decoding pipeline unit. Therefore, the left side implies the recursive parsing of the split modes, and possible the decoding of a CU, in case its size is larger than the decoding unit size in a step 921. The decoding 921 of such a large CU is depicted on FIG. 11. According, to a variant, a quad tree split operation divides the CUs into sub-block equal to DPU size (for instance, in case of a 128×128 CTUs, a quad tree split operation divides 128×128 CTUs into 4 64×64 Coding Units).

According to another variant, the quad-tree split mode may be inferred for CUs larger than the DPU size, as for the encoder side.

With respect to the right side of FIG. 10, it comprises the parsing, decoding and reconstruction of the coding unit contained in the considered picture area, successively, and independently, for the Luma component and then for the chroma component.

Figure 11:
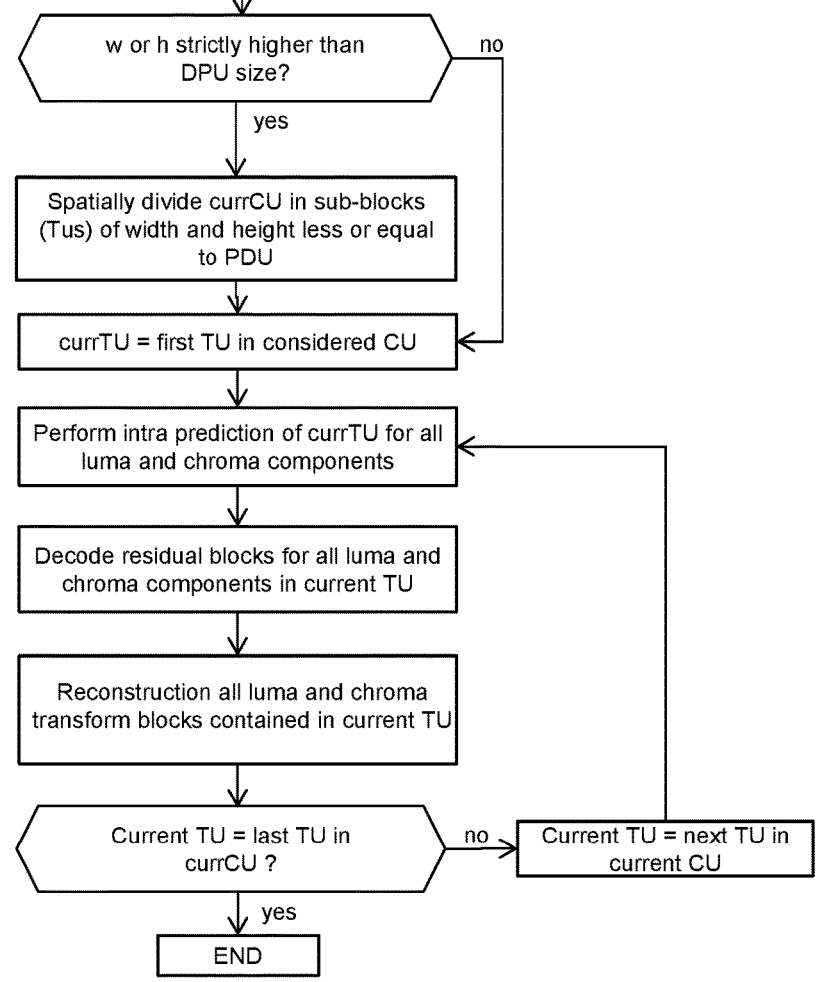

Module/operation from FIGS. 10 and 11 can be located, for example, between modules 230 (entropy decoding comprising parsing of syntax element) and 235 (partitioning) of FIG. 14 (shown later).

4 Alternative Embodiment of the Decoding

This section illustrates an alternative embodiment of the decoding process of section 3. The difference here is that the block decoding process is performed on a decoding pipeline basis, in order to explicitly conform to the constraint considered for the decoding process. Indeed, a decoder compatible with an embodiment of the present principles is advantageously able to perform all the decoding process of a decoding unit for Luma and Chroma components, before starting to process next decoding unit.

Figure 12:
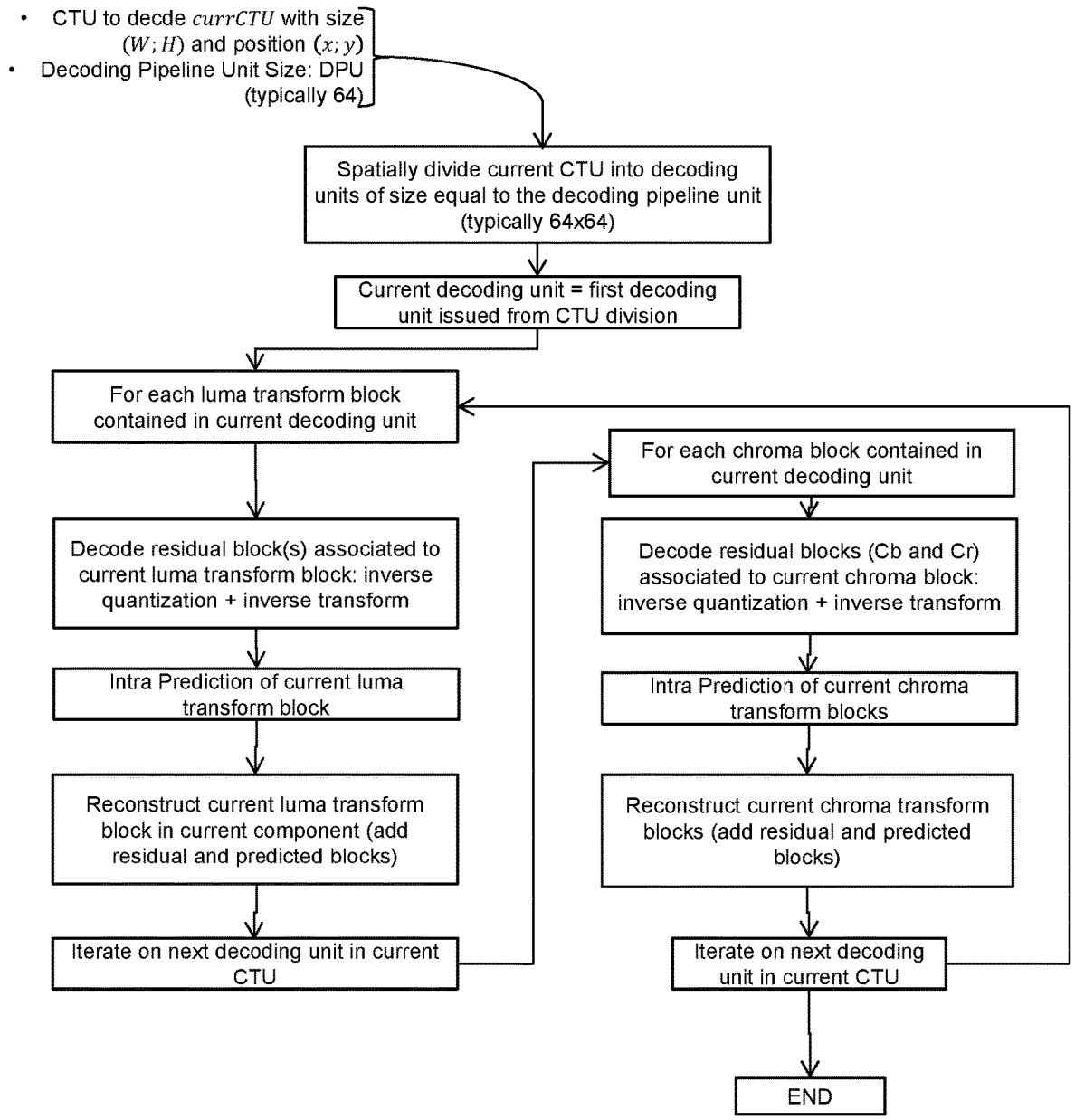

FIG. 12 shows the decoding unit-based process that is used to decode and reconstruct the luma and chroma blocks, according to an embodiment of this invention. The process first spatially divide CTUs into decoding unit of size equal to the decoding pipeline unit, typically 64×64.

For instance, this division is performed through a quad-tree split operation, which divides 128×128 CTUs into 4 64×64 Coding Units.

The process involves a loop over all the decoding unit (of typical size 64×64) comprised in the considered CTU. For each decoding unit, the luma blocks contained in the decoding unit are first decoded, then the chroma blocks comprised in the decoding unit are decoded and reconstructed.

5 Additional Embodiments and Information

This section describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this document can be implemented in many different forms. FIGS. 13, 14 and 15 below provide some embodiments, but other embodiments are contemplated and the discussion of FIGS. 13, 14 and 15 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described above, and each of the methods comprises one or more steps or actions for achieving the described method. Unless a specific order of steps or actions is required for proper operation of the method, the order and/or use of specific steps and/or actions may be modified or combined.

Figure 13:
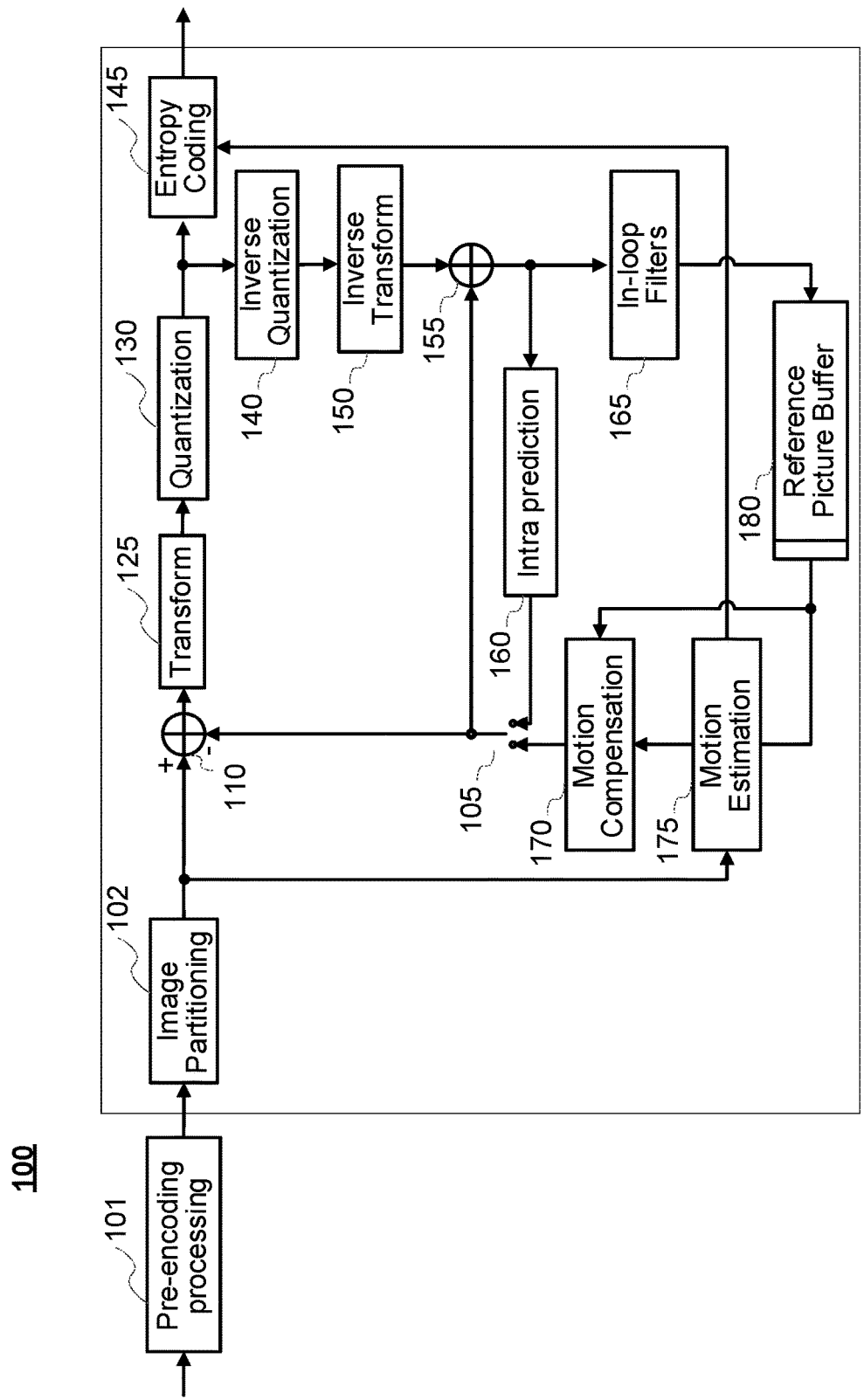
FIG. 13 illustrates a block diagram of an embodiment of video encoder in which various aspects of the embodiments may be implemented.
Figure 14:
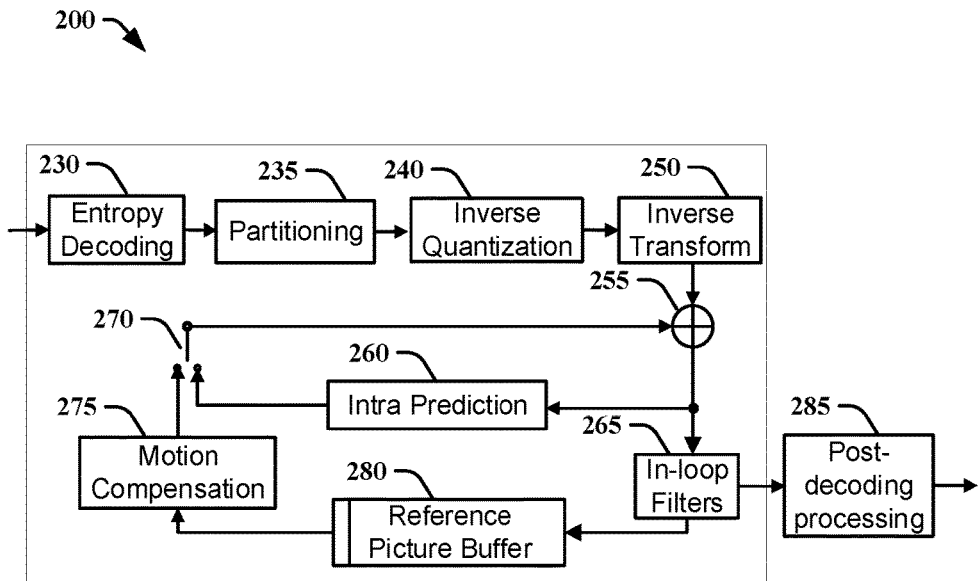
FIG. 14 illustrates a block diagram of an embodiment of video decoder in which various aspects of the embodiments may be implemented.
Figure 15:
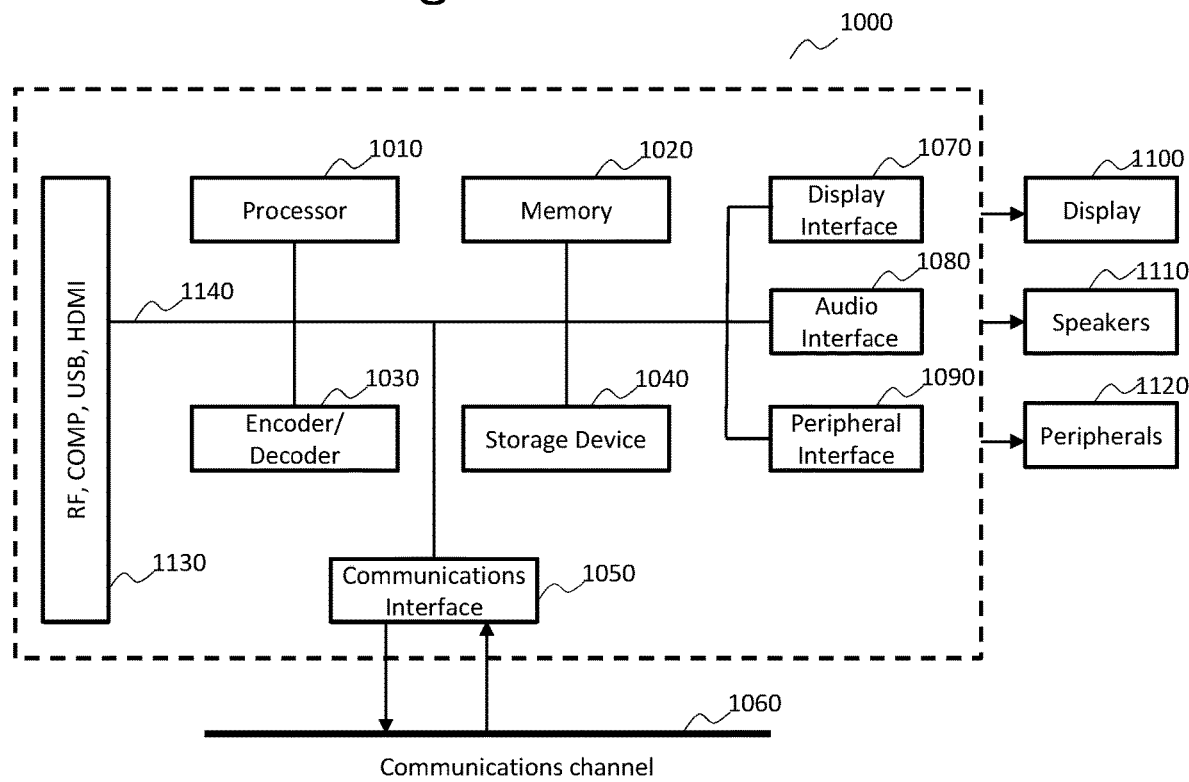
FIG. 15 illustrates a block diagram of an example apparatus in which various aspects of the embodiments may be implemented.

Various methods and other aspects described in this document can be used to modify modules, such as, for example, the partitioning modules (102, 235) and the entropy decoding module (230), of a JVET or HEVC encoder 100 and decoder 200 as shown in FIG. 13 and FIG. 14. Moreover, the present aspects are not limited to JVET or HEVC, and can be applied, for example, to other standards and recommendations, whether pre-existing or future-developed, and extensions of any such standards and recommendations (including JVET and HEVC). Unless indicated otherwise, or technically precluded, the aspects described in this document can be used individually or in combination.

Various numeric values are used in the present document, for example, a decoding unit pipeline of 64×64 or block partition (CU, TU) size. The specific values are for exemplary purposes and the aspects described are not limited to these specific values.

FIG. 13 illustrates an exemplary encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the exemplary encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 14 illustrates a block diagram of an exemplary video decoder 200. In the exemplary decoder 200, a bitstream is decoded by the decoder elements as described below. Video decoder 200 generally performs a decoding pass reciprocal to the encoding pass as described in FIG. 13. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 15 illustrates a block diagram of an exemplary system in which various aspects and exemplary embodiments are implemented. System 1000 can be embodied as a device including the various components described below and is configured to perform one or more of the aspects described in this document. Examples of such devices, include, but are not limited to, personal computers, laptop computers, smartphones, tablet computers, digital multimedia set top boxes, digital television receivers, personal video recording systems, connected home appliances, and servers. System 1000 can be communicatively coupled to other similar systems, and to a display via a communication channel as shown in FIG. 15 and as known by those skilled in the art to implement the various aspects described in this document.

The system 1000 can include at least one processor 1010 configured to execute instructions loaded therein for implementing the various aspects described in this document. Processor 1010 can include embedded memory, input output interface, and various other circuitries as known in the art. The system 1000 can include at least one memory 1020 (e.g., a volatile memory device, a non-volatile memory device). System 1000 can include a storage device 1040, which can include non-volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples. System 1000 can include an encoder/decoder module 1030 configured to process data to provide an encoded video or decoded video, and the encoder/decoder module 1030 can include its own processor and memory.

Encoder/decoder module 1030 represents the module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processors 1010 as a combination of hardware and software as known to those skilled in the art.

Program code to be loaded onto processors 1010 to perform the various aspects described in this document can be stored in storage device 1040 and subsequently loaded onto memory 1020 for execution by processors 1010. In accordance with the exemplary embodiments, one or more of the processor(s) 1010, memory 1020, storage device 1040, and encoder/decoder module 1030 can store one or more of the various items during the performance of the processes described in this document, including, but not limited to the input video, the decoded video, the bitstream, equations, formulas, matrices, variables, operations, and operational logic.

The system 1000 can include communication interface 1050 that enables communication with other devices via communication channel 1060. The communication interface 1050 can include, but is not limited to, a transceiver configured to transmit and receive data from communication channel 1060. The communication interface 1050 can include, but is not limited to, a modem or network card and the communication channel can be implemented within a wired and/or a wireless medium. The various components of system 1000 can all be connected or communicatively coupled together using various suitable connections, including, but not limited to internal buses, wires, and printed circuit boards.

The exemplary embodiments can be carried out by computer software implemented by the processor 1010 or by hardware, or by a combination of hardware and software. As a non-limiting example, the exemplary embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Additionally, this document may refer to optimization and various embodiments do not need to be fully optimized, some embodiments simply select a mode without an optimization in the ordinary sense.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We have described a number of embodiments. These embodiments provide, at least, for the following generalized inventions and claims, including all combinations, across various different claim categories and types:

Modifying the luma and chroma coding trees applied in the decoder and/or encoder.

Combining an interleaved luma/chroma coding and a separated luma/chroma coding applied in the decoder and/or encoder.

Combining an interleaved luma/chroma coding and a separated luma/chroma coding wherein the a separated luma/chroma coding is controlled by an information relative to a constraint on the decoding unit pipeline applied in the decoder and/or encoder.

Jointly deciding, encoding and signaling the Luma and Chroma coding trees from the maximum allowed block size (CTU size) down to a given block size or up to a given CU depth level and independently deciding, encoding and signaling the Luma and Chroma coding trees for blocks which size is below the given block size or block over the given CU depth level.

Switching from an interleaved luma/chroma coding to a separated luma/chroma coding, according to the block size associated to the processed coding tree node, or according to the depth level of the coding tree node being encoded/decoded.

Enabling several partially shared luma and chroma coding trees methods in the decoder and/or encoder.

Selecting, based on some syntax elements, the luma and chroma coding trees to apply at the decoder.

Creating and/or transmitting and/or receiving and/or decoding a bitstream or signal that includes one or more of the described encoded luma/chroma components, or variations thereof.

A TV, set-top box, cell phone, tablet, or other electronic device that performs encoding/decoding enabling partially shared luma and chroma coding trees methods according to any of the embodiments described.

A TV, set-top box, cell phone, tablet, or other electronic device that performs encoding/decoding enabling partially shared luma and chroma coding trees methods according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs decoding enabling partially shared luma and chroma coding trees methods according to any of the embodiments described.

A TV, set-top box, cell phone, tablet, or other electronic device that receives (e.g. using an antenna) a signal over the air that includes an encoded image, and performs decoding enabling partially shared luma and chroma coding trees methods according to any of the embodiments described.

Various other generalized, as well as particularized, inventions and claims are also supported and contemplated throughout this disclosure.

The invention claimed is:

1. A method comprising:
   decoding a partitioning tree structure corresponding to a partitioning process of a block of an image of a video; and
   decoding said block based at least on said partitioning tree structure;
   wherein the partitioning tree structure has a switching node representing a predetermined partitioning block size, such that, above the switching node, luma blocks and chroma blocks share a single partitioning tree structure, and at or below the switching node, luma blocks and chroma blocks have separate partitioning tree structures.

2. The method according to claim 1 wherein said partitioning tree structure is used for decoding a block belonging to a part of the video image coded in Intra.

3. The method according to claim 1 wherein the switching node is implicitly determined.

4. The method according to claim 1 wherein said predetermined partitioning block size is set to 64×64.

5. The method according to claim 1 wherein the switching node is signaled.

6. An apparatus comprising a memory and one or more processors configured to:
   decode a partitioning tree structure corresponding to a partitioning process of a block of an image of a video; and
   decode said block based at least on said partitioning tree structure;
   wherein the partitioning tree structure has a switching node representing a predetermined partitioning block size, such that, above the switching node, luma blocks and chroma blocks share a single partitioning tree structure, and at or below the switching node, luma blocks and chroma blocks have separate partitioning tree structures.

7. The apparatus according to claim 6 wherein said partitioning tree structure is used to decode a block belonging to a part of the video image coded in Intra.

8. The apparatus according to claim 6 wherein the switching node is implicitly determined.

9. The apparatus according to claim 6 wherein said predetermined partitioning block size is set to 64×64.

10. The apparatus according to claim 6 wherein the switching node is signaled.

11. A method comprising:
    determining a partitioning tree structure corresponding to a partitioning process of a block of an image of a video; and
    coding said block based at least on said partitioning tree structure;
    wherein a the partitioning tree structure has a switching node representing a predetermined partitioning block size, such that, above the switching node, luma blocks and chroma blocks share a single partitioning tree structure, and at or below the switching node, luma blocks and chroma blocks have separate partitioning tree structures.

12. The method according to claim 11 wherein said partitioning tree structure is used for coding a block belonging to a part of the video image coded in Intra.

13. The method according to claim 11 wherein the switching node is implicitly determined.

14. The method according to claim 11 wherein said predetermined partitioning block size is set to 64×64.

15. The method according to claim 11 wherein the switching node is signaled.

16. An apparatus comprising a memory and one or more processors configured to:
    determine a partitioning tree structure corresponding to a partitioning process a block of an image of a video; and
    code said block based at least on said partitioning tree structure;
    wherein the partitioning tree structure has a switching node representing a predetermined partitioning block size, such that, above the switching node, luma blocks and chroma blocks share a single partitioning tree structure, and at or below the switching node, luma blocks and chroma blocks have separate partitioning tree structures.

17. The apparatus according to claim 16 wherein said partitioning tree structure is used to code a block belonging to a part of the video image coded in Intra.

18. The apparatus according to claim 16 wherein the switching node is implicitly determined.

19. The apparatus according to claim 16 wherein said predetermined partitioning block size is set to 64×64.

20. The apparatus according to claim 16 wherein the switching node is signaled.

21. A non-transitory program storage device, readable by a computer, tangibly embodying a program of instructions executable by the computer for performing the method according to claim 1.

22. A non-transitory program storage device, readable by a computer, tangibly embodying a program of instructions executable by the computer for performing the method according to claim 11.

23. A non-transitory program storage device having encoded data representative of a block in an image of a video, the encoded data comprising a partitioning tree structure corresponding to a partitioning process of the block, wherein the partitioning tree structure has a switching node representing a predetermined partitioning block size, such that, above the switching node, luma blocks and chroma blocks share a single partitioning tree structure, and at or below the switching node, luma blocks and chroma blocks have separate partitioning tree structures.

24. The non-transitory program storage device of claim 23 wherein the encoded data is interleaved based on the predetermined partitioning block size.

* * * * *